(12) United States Patent
Nguyen et al.

(10) Patent No.: US 11,506,318 B2
(45) Date of Patent: Nov. 22, 2022

(54) DUAL CONTAINMENT FITTING AND DUAL CONTAINMENT FITTING ASSEMBLY

(71) Applicant: SAINT-GOBAIN PERFORMANCE PLASTICS CORPORATION, Solon, OH (US)

(72) Inventors: Hy B. Nguyen, Upland, CA (US); Thuan An T. Dinh, Tustin, CA (US); Mario Fregoso, Whittier, CA (US); Ankit Soni, Irvine, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 299 days.

(21) Appl. No.: 16/223,617

(22) Filed: Dec. 18, 2018

(65) Prior Publication Data

US 2019/0195399 A1    Jun. 27, 2019

Related U.S. Application Data

(60) Provisional application No. 62/608,259, filed on Dec. 20, 2017.

(51) Int. Cl.
*F16L 39/00* (2006.01)
*F16L 47/04* (2006.01)
(Continued)

(52) U.S. Cl.
CPC ......... *F16L 39/005* (2013.01); *F16L 19/0283* (2013.01); *F16L 47/041* (2019.08);
(Continued)

(58) Field of Classification Search
CPC ....... F16L 39/005; F16L 19/07; F16L 19/062; F16L 19/061; F16L 19/0283;
(Continued)

(56) References Cited

U.S. PATENT DOCUMENTS 4,817,996 A    4/1989  Fouts
4,871,196 A   10/1989  Kingsford
(Continued)

FOREIGN PATENT DOCUMENTS

CN    104395665 A    3/2015
TW     I534381 B     5/2016

OTHER PUBLICATIONS

International Search Report and Written Opinion for PCT/US2018/066190, dated Mar. 28, 2019, 13 pages.

*Primary Examiner* — Zachary T Dragicevich
(74) *Attorney, Agent, or Firm* — Abel Schillinger, LLP; Chi Suk Kim

(57) ABSTRACT

A dual containment fitting may include a primary tubing, a secondary tubing, and a dual containment body. The secondary tubing may surround and be concentric with a first portion of the primary tubing forming a first leak containment space between the primary tubing and the secondary tubing. The dual containment body may include a flare fitting portion and a primary containment nut portion. The flare fitting portion may surround and be concentric with the primary tubing forming a second leak containment space between the primary tubing and the flare fitting portion. The primary containment nut portion may surround and be concentric with the flared end of the primary tubing forming a third leak containment space between the primary tubing and the primary containment nut portion. The primary containment nut portion may include at least one leak passage hole connecting the third leak containment space with the second leak containment space.

17 Claims, 4 Drawing Sheets

(51) Int. Cl.
  *F16L 19/028*   (2006.01)
  *F16L 19/02*    (2006.01)
  *F16L 11/04*    (2006.01)
  *F16L 49/06*    (2006.01)

(52) U.S. Cl.
  CPC ............ *F16L 11/04* (2013.01); *F16L 19/0212* (2013.01); *F16L 49/06* (2013.01)

(58) Field of Classification Search
  CPC ......... F16L 47/041; F16L 47/04; F16L 47/32; F16L 47/265; F16L 37/105
  USPC ................................ 285/123.15, 123.1, 353
  See application file for complete search history.

(56) References Cited

U.S. PATENT DOCUMENTS

| | | | |
|---|---|---|---|
| 5,449,203 A * | 9/1995 | Sharp .................... | F16L 39/005 285/123.14 |
| 5,498,036 A | 3/1996 | Kingsford | |
| 5,655,794 A | 8/1997 | Sell | |
| 5,934,712 A | 8/1999 | Friedrich et al. | |
| 9,074,708 B2 | 7/2015 | Fujii et al. | |
| 9,599,264 B2 | 3/2017 | Buerli et al. | |
| 9,746,118 B2 | 8/2017 | Chien et al. | |
| 2006/0157975 A1 | 7/2006 | Fujii et al. | |
| 2009/0284004 A1 | 11/2009 | Simmons et al. | |
| 2015/0059862 A1* | 3/2015 | Spears, II ............. | F16L 39/005 |
| 2017/0122473 A1* | 5/2017 | Hayes, Jr. ............ | F16L 39/005 |
| 2019/0316719 A1* | 10/2019 | Haynes ................ | F16L 39/005 |

* cited by examiner

DUAL CONTAINMENT FITTING AND DUAL CONTAINMENT FITTING ASSEMBLY

CROSS-REFERENCE TO RELATED APPLICATION(S)

This application claims priority under 35 U.S.C. § 119(e) to U.S. Patent Application No. 62/608,259 entitled "DUAL CONTAINMENT FITTING AND DUAL CONTAINMENT FITTING ASSEMBLY," by Hy B. NGUYEN et al., filed Dec. 20, 2017, which is assigned to the current assignee hereof and incorporated herein by reference in its entirety.

FIELD OF THE DISCLOSURE

The present disclosure relates generally to a dual containment fitting. More particularly, the present disclosure related to a dual containment fitting for connecting tubing to a secondary fluid transfer component in a dual containment fitting assembly.

BACKGROUND

Dual containment fitting assemblies are designed to connect threaded and non-threaded tubing to secondary components, such as other tubing or valve assemblies. The use of such assemblies can facilitate connections of concentric inner and outer plastic tubes in an arrangement such that the outer tubing contains any leakage of fluid from the inner tubing. Although such dual fitting assemblies reduces the problem of leakage from the inner tubing itself, in view of the aggressive nature of the caustic chemicals and process conditions that are used in the semiconductor manufacturing industry, it is desirable that additional containment options be developed for possible leakage around the connection between the tubing and the secondary components. It is therefore desirable that improved fitting assemblies continue to be developed in order to provide additional leakage protection around the intersections between the tubing and the secondary components.

SUMMARY

According to one aspect, a dual containment fitting may include a primary tubing having a flared end, a secondary tubing having a flared end, and a dual containment body. The secondary tubing may surround and be concentric with a first portion of the primary tubing forming a first leak containment space between the primary tubing and the secondary tubing. The dual containment body may include a flare fitting portion, a primary containment nut portion and a bore therethrough. The flare fitting portion may surround and be concentric with a second portion of the primary tubing forming a second leak containment space between the primary tubing and the flare fitting portion. The flare fitting portion may compressively engage with the flared end of the secondary tubing connecting the first leak containment space with the second leak containment space. The primary containment nut portion may surround and be concentric with the flared end of the primary tubing forming a third leak containment space between the primary tubing and the primary containment nut portion. The primary containment nut portion may include at least one leak passage hole connecting the third leak containment space with the second leak containment space.

According to yet another aspect, a dual containment fitting assembly may include a primary tubing having a flared end, a secondary tubing having a flared end, a dual containment body and a valve assembly annular fitting body. The secondary tubing may surround and be concentric with a first portion of the primary tubing forming a first leak containment space between the primary tubing and the secondary tubing. The dual containment body may include a flare fitting portion, a primary containment nut portion and a bore therethrough. The flare fitting portion may surround and be concentric with a second portion of the primary tubing forming a second leak containment space between the primary tubing and the flare fitting portion. The flare fitting portion may compressively engage with the flared end of the secondary tubing connecting the first leak containment space with the second leak containment space. The primary containment nut portion may surround and be concentric with the flared end of the primary tubing forming a third leak containment space between the primary tubing and the primary containment nut portion. The primary containment nut portion may include at least one leak passage hole connecting the third leak containment space with the second leak containment space. The valve assembly annular fitting body may include a first end, a second end and a bore therethrough. The first end of the annular fitting body may be threadably engaged at the primary containment nut portion of the dual containment body so that the flared end of the primary tubing compressively engages within the first end if the annular fitting body.

BRIEF DESCRIPTION OF THE DRAWINGS

Embodiments are illustrated by way of example and are not limited to the accompanying figures.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a dual containment fitting for connecting tubing or a tubing type component to a valve assembly or to another tubing type component. The dual containment fitting is configured such that the connection includes leak containment spaces surrounding a primary tubing and the intersection between the tubing component and the valve assembly or the additional tubing component. According to certain embodiments, the dual containment fitting that may include a primary tubing, a secondary tubing, and a dual containment body. According to still other embodiment, the combination of the dual containment fitting connected to the valve assemble or the additional tubing component may be referred to as a dual containment fitting assembly.

These concepts are better understood in view of the embodiments described below that illustrate and do not limit the scope of the present disclosure.

Figure 1:
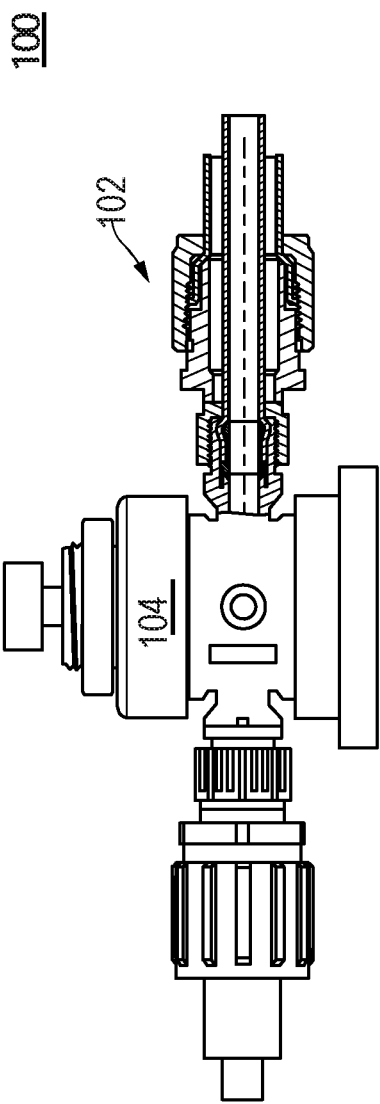
FIG. 1 includes an illustration of a perspective view of a dual containment fitting assembly according to certain embodiments described herein.

FIG. 1 includes an illustration of a perspective view of a dual containment fitting assembly 100 that may include a dual containment fitting 102 connected to a valve assembly 104.

Figure 2:
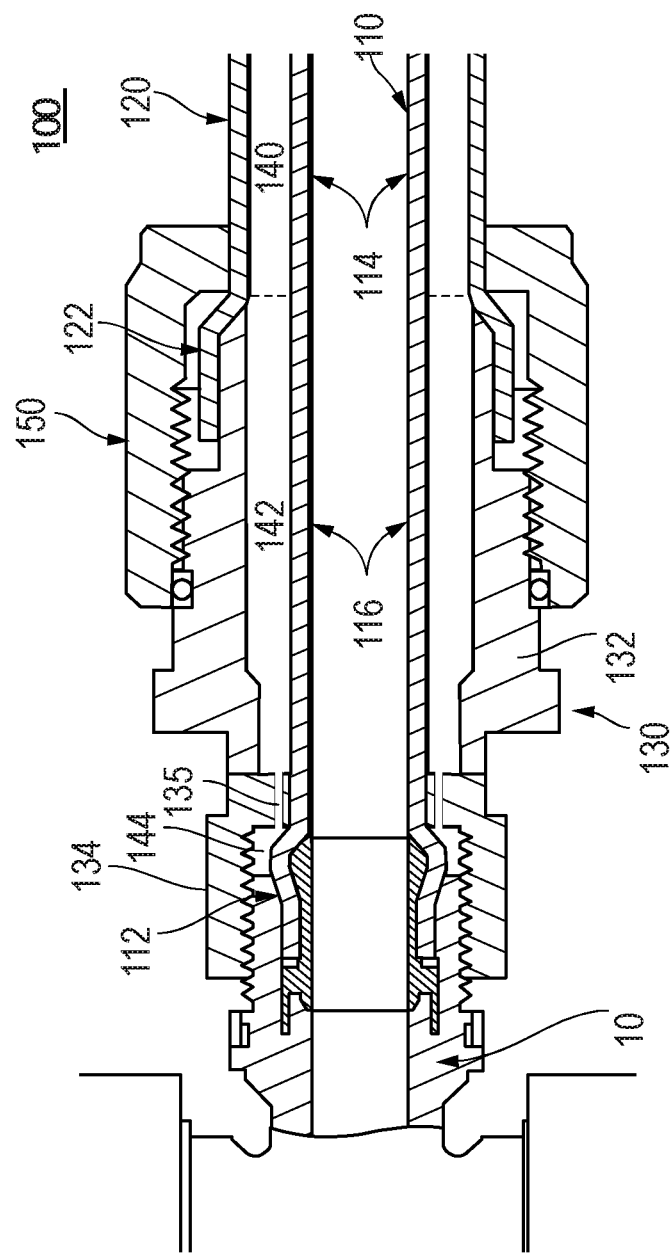
FIG. 2 includes an illustration of a perspective view of a dual containment fitting assembly according to certain embodiments described herein.

FIG. 2 includes an illustration of the dual containment fitting 102 connected to a valve assembly 104. According to particular embodiments, and as shown in FIG. 2, the dual containment fitting 102 may include a primary tubing 110, a secondary tubing 120, and a dual containment body 130. The primary tubing 110 may include a flared end 112, a first portion 114 and a second portion 116. The secondary tubing 120 may include a flared end 122.

As also shown in FIG. 2, according to certain embodiments, the secondary tubing 120 may surround the first portion 114 of the primary tubing 110. According to still other embodiments, the secondary tubing 120 may be concentric with the first portion 114 of the primary tubing 110. According to yet other embodiments, the secondary tubing 120 may form a first leak containment space 140 between the first portion 114 of the primary tubing 110 and the secondary tubing 120.

As further shown in FIG. 2, the dual containment body 130 may include a flare fitting portion 132, a primary containment nut portion 134 and a bore therethrough.

According to certain embodiments, the flare fitting portion 132 may surround the second portion 116 of the primary tubing 110. According to yet other embodiments, the flare fitting portion 132 may be concentric with the second portion 116 of the primary tubing 110. According to yet other embodiment, the flare fitting portion 132 second leak containment space 142 between the second portion 116 of the primary tubing 110 and the flare fitting portion 132 of the dual containment body 130. According to still other embodiments, the flare fitting portion 132 of the dual containment body 130 may compressively engage with the flared end 112 of the secondary tubing 120 connecting the first leak containment space 140 with the second leak containment space 142.

According to yet other embodiments, the primary containment nut portion 134 may surround the flared end 112 of the primary tubing 110. According to still other embodiments, the primary containment nut portion 134 may be concentric with the flared end 112 of the primary tubing 110. According to still other embodiments, the primary containment nut portion 134 may form a third leak containment space 144 between the flared end 112 of the primary tubing 110 and the primary containment nut portion 134 of the dual containment body 130.

According to yet other embodiments, the primary containment nut portion 134 may include at least one leak passage hole 135 connecting the third leak containment space 144 with the second leak containment space 142.

As further shown in FIG. 2, the deal containment fitting 102 may further include a secondary containment nut 150. According to certain embodiments, the secondary containment nut 150 may surround the flared end 122 of the secondary tubing 120. According to yet other embodiments, the secondary containment nut 150 may be concentric with the flared end 122 of the secondary tubing 120. According to still other embodiments, the secondary containment nut 150 may threadably engage with the flare fitting portion 132 of the dual containment body 130. According to yet other embodiments, the secondary containment nut 150 may compressively engage the flared end 122 of the secondary tubing 120 with the flare fitting portion 132 of the dual containment body 130.

Figure 3:
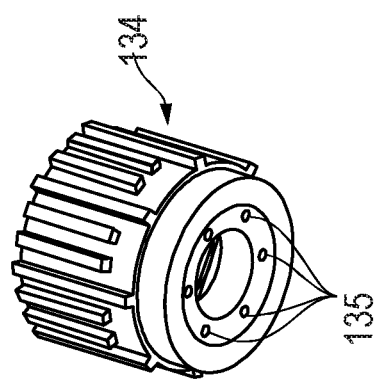

FIG. 3 includes an illustration of an alternative view of the primary containment nut portion 134 of the dual containment body 130 of the dual containment fitting 102 illustrated in FIG. 2. FIG. 3 further illustrates the leak passage hoes 135 through the primary containment nut portion 134.

Figure 4:
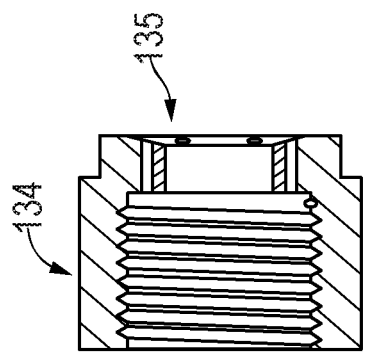

FIG. 4 includes an illustration of an alternative view of the primary containment nut portion 134 of the dual containment body 130 of the dual containment fitting 102 illustrated in FIG. 2. FIG. 4 further illustrates the leak passage hoes 135 through the primary containment nut portion 134.

Figure 5:
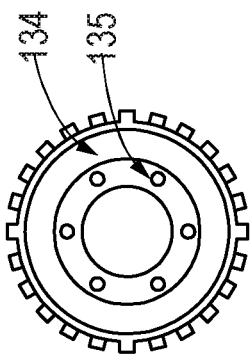
FIGS. 3-5 include illustrations of various views of the primary containment nut portion of the dual containment body of the dual containment fitting assembly illustrated in FIG. 1.

FIG. 5 includes an illustration of an alternative view of the primary containment nut portion 134 of the dual containment body 130 of the dual containment fitting 102 illustrated in FIG. 2. FIG. 3 further illustrates the leak passage hoes 135 through the primary containment nut portion 134.

Figure 6:
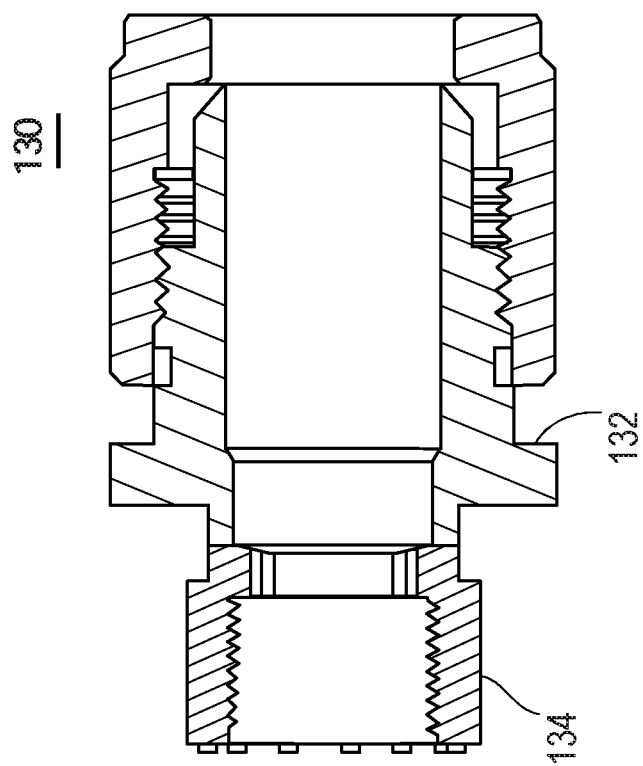
FIG. 6 includes an illustration of the dual containment body of the dual containment fitting assembly Skilled artisans appreciate that elements in the figures are illustrated for simplicity and clarity and have not necessarily been drawn to scale.

FIG. 6 includes an illustration of dual containment body 130. As shown in FIG. 6, the dual containment body 130 may include a flare fitting portion 132, a primary containment nut portion 134 and a bore therethrough as illustrated in FIG. 2.

According to certain embodiments, the primary tubing 110 may include a particular material. According to still other embodiments, the primary tubing 110 may include a polymer material. According to yet other embodiments, the primary tubing 110 may consist essentially of a polymer material. According to other embodiments, the polymer material of the primary tubing 110 may include perfluoroalkoxy (PFA). According to yet other embodiments, the polymer material of the primary tubing 110 may consist essentially of perfluoroalkoxy (PFA). According to still other embodiments, the primary tubing 110 may include perfluoroalkoxy (PFA). According to yet other embodiments, the primary tubing 110 may consist essentially of perfluoroalkoxy (PFA).

According to still other embodiments, the primary tubing 110 may include an outer wall. According to yet other embodiments, the outer wall of the primary tubing 110 may have a particular thickness. For example, the outer wall of the primary tubing 110 may have a thickness of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the outer wall of the primary tubing 110 may have a thickness of not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or even not greater than about 1.6 mm. It will be appreciated that the thickness of the outer wall of the primary tubing 110 may be within a range between any of the values noted above. It will be further appreciated that the thickness of the outer wall of the primary tubing 110 may be any value between any of the values noted above.

According to yet other embodiments, the primary tubing 110 may have a particular average inner diameter. For example, the average inner diameter of the primary tubing 110 may be at least about 3.0 mm, such as, at least about 3.25 mm or at least about 3.5 mm or at least about 3.75 mm or at least about 4.0 mm or at least about 4.25 mm or at least about 4.50 mm or at least about 4.75 mm or at least about 5.0 mm or at least about 5.25 mm or at least about 5.5 mm or at least about 5.75 mm or at least about 6.0 mm or at least about 6.25 mm or at least about 6.5 mm or at least about 6.75 mm or at least about 7.0 mm or at least about 7.25 mm or at least about 7.5 mm or at least about 7.75 mm or at least about 8.0 mm or at least about 8.25 mm or at least about 8.5 mm or at least about 8.75 mm or at least about 9.0 mm or at least about 9.25 mm or at least about 9.5 mm or at least about 9.75 mm or even at least about 10.0 mm. According to yet other embodiments, the average inner diameter of the primary tubing 110 may be not greater than about 20 mm, such as, not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or not greater than about 14.0 mm. It will be appreciated that the average inner diameter of the outer wall of the primary tubing 110 may be within a range between any of the values noted above. It will be further appreciated that the inner diameter of the outer wall of the primary tubing 110 may be any value between any of the values noted above.

According to still other embodiments, the primary tubing 110 may have a particular average outer diameter. For example, the average outer diameter of the primary tubing 110 may be at least about 5 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11 mm or at least about 11.5 mm or at least about 12.0 mm or even at least about 12.5 mm. According to yet other embodiments, the average outer diameter of the primary tubing 110 may be not greater than about 20 mm, such as, not greater than about 19.5 mm or not greater than about 19.0 mm or not greater than about 18 mm or not greater than about 18.5 mm or not greater than about 18 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or even not greater than about 13 mm. It will be appreciated that the average outer diameter of the outer wall of the primary tubing 110 may be within a range between any of the values noted above. It will be further appreciated that the outer diameter of the outer wall of the primary tubing 110 may be any value between any of the values noted above.

According to certain embodiments, the flared end 112 of the primary tubing 110 may include a particular material. According to still other embodiments, the flared end 112 of the primary tubing 110 may include a polymer material. According to yet other embodiments, the flared end 112 of the primary tubing 110 may consist essentially of a polymer material. According to other embodiments, the polymer material of the flared end 112 of the primary tubing 110 may include perfluoroalkoxy (PFA). According to yet other embodiments, the polymer material of the flared end 112 of the primary tubing 110 may consist essentially of perfluoroalkoxy (PFA). According to still other embodiments, the flared end 112 of the primary tubing 110 may include perfluoroalkoxy (PFA). According to yet other embodiments, the flared end 112 of the primary tubing 110 may consist essentially of perfluoroalkoxy (PFA).

According to still other embodiments, the flared end 112 of the primary tubing 110 may include an outer wall. According to yet other embodiments, the outer wall of the flared end 112 of the primary tubing 110 may have a particular thickness. For example, the outer wall of the flared end 112 of the primary tubing 110 may have a thickness of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the outer wall of the flared end 112 of the primary tubing 110 may have a thickness of not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or even not greater than about 1.6 mm. It will be appreciated that the thickness of the outer wall of the flared end 112 of the primary tubing 110 may be within a range between any of the values noted above. It will be further appreciated that the thickness of the outer wall of the flared end 112 of the primary tubing 110 may be any value between any of the values noted above.

According to yet other embodiments, the flared end 112 of the primary tubing 110 may have a particular maximum inner diameter. For example, the maximum inner diameter of the flared end 112 of the primary tubing 110 may be at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the maximum inner diameter of the flared end 112 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the maximum inner diameter of the flared end 112 of the primary tubing 110 may be within a range between any of the values noted above. It will be further appreciated that the maximum inner diameter of the flared end 112 of the primary tubing 110 may be any value between any of the values noted above.

According to yet other embodiments, the flared end 112 of the primary tubing 110 may have a particular minimum inner diameter. For example, the minimum inner diameter of the flared end 112 of the primary tubing 110 may be at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the minimum inner diameter of the flared end 112 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the minimum inner diameter of the flared end 112 of the primary tubing 110 may be within a range between any of the values noted above. It will be further appreciated that the minimum inner diameter of the flared end 112 of the primary tubing 110 may be any value between any of the values noted above.

According to yet other embodiments, the flared end 112 of the primary tubing 110 may have a particular maximum outer diameter. For example, the maximum outer diameter of the flared end 112 of the primary tubing 110 may be at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the maximum outer diameter of the flared end 112 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the maximum outer diameter of the flared end 112 of the primary tubing 110 may be within a range between any of the values noted above. It will be further appreciated that the maximum outer diameter of the flared end 112 of the primary tubing 110 may be any value between any of the values noted above.

According to yet other embodiments, the flared end 112 of the primary tubing 110 may have a particular minimum outer diameter. For example, the minimum outer diameter of the flared end 112 of the primary tubing 110 may be at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the minimum outer diameter of the flared end 112 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the minimum outer diameter of the flared end 112 of the primary tubing 110 may be within a range between any of the values noted above. It will be further appreciated that the minimum outer diameter of the flared end 112 of the primary tubing 110 may be any value between any of the values noted above.

According to certain embodiments, the first portion 114 of the primary tubing 110 may include a particular material. According to still other embodiments, the first portion 114 of the primary tubing 110 may include a polymer material. According to yet other embodiments, the first portion 114 of the primary tubing 110 may consist essentially of a polymer material. According to other embodiments, the polymer material of the first portion 114 of the primary tubing 110 may include perfluoroalkoxy (PFA). According to yet other embodiments, the polymer material of the first portion 114 of the primary tubing 110 may consist essentially of perfluoroalkoxy (PFA). According to still other embodiments, the first portion 114 of the primary tubing 110 may include perfluoroalkoxy (PFA). According to yet other embodiments, the first portion 114 of the primary tubing 110 may consist essentially of perfluoroalkoxy (PFA).

According to still other embodiments, the first portion 114 of the primary tubing 110 may include an outer wall. According to yet other embodiments, the outer wall of the first portion 114 of the primary tubing 110 may have a particular thickness. For example, the outer wall of the first portion 114 of the primary tubing 110 may have a thickness of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the outer wall of the first portion 114 of the primary tubing 110 may have a thickness of not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or even not greater than about 1.6 mm. It will be appreciated that the thickness of the outer wall of the first portion 114 of the primary tubing 110 may be within a range between any of the values noted above. It will be further appreciated that the thickness of the outer wall of the first portion 114 of the primary tubing 110 may be any value between any of the values noted above.

According to yet other embodiments, the first portion 114 of the primary tubing 110 may have a particular maximum inner diameter. For example, the maximum inner diameter of the first portion 114 of the primary tubing 110 may be at least about 3.0 mm, such as, at least about 3.5 mm or at least about 4.0 mm or at least about 4.5 mm or at least about 5.0 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the maximum inner diameter of the first portion 114 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the maximum inner diameter of the first portion 114 of the primary tubing 110 may be within a range between any of the values noted above. It will be further appreciated that the maximum inner diameter of the first portion 114 of the primary tubing 110 may be any value between any of the values noted above.

According to yet other embodiments, the first portion 114 of the primary tubing 110 may have a particular minimum inner diameter. For example, the minimum inner diameter of the first portion 114 of the primary tubing 110 may be at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the minimum inner diameter of the first portion 114 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the minimum inner diameter of the first portion 114 of the primary tubing 110 may be within a range between any of the values noted above. It will be further appreciated that the minimum inner diameter of the first portion 114 of the primary tubing 110 may be any value between any of the values noted above.

According to certain embodiments, the second portion 116 of the primary tubing 110 may include a particular material. According to still other embodiments, the second portion 116 of the primary tubing 110 may include a polymer material. According to yet other embodiments, the second portion 116 of the primary tubing 110 may consist essentially of a polymer material. According to other embodiments, the polymer material of the second portion 116 of the primary tubing 110 may include perfluoroalkoxy (PFA). According to yet other embodiments, the polymer material of the second portion 116 of the primary tubing 110 may consist essentially of perfluoroalkoxy (PFA). According to still other embodiments, the second portion 116 of the primary tubing 110 may include perfluoroalkoxy (PFA). According to yet other embodiments, the second portion 116 of the primary tubing 110 may consist essentially of perfluoroalkoxy (PFA).

According to still other embodiments, the second portion 116 of the primary tubing 110 may include an outer wall. According to yet other embodiments, the outer wall of the second portion 116 of the primary tubing 110 may have a particular thickness. For example, the outer wall of the second portion 116 of the primary tubing 110 may have a thickness of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the outer wall of the second portion 116 of the primary tubing 110 may have a thickness of not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or even not greater than about 1.6 mm. It will be appreciated that the thickness of the outer wall of the second portion 116 of the primary tubing 110 may be within a range between any of the values noted above. It will be further appreciated that the thickness of the outer wall of the second portion 116 of the primary tubing 110 may be any value between any of the values noted above.

According to yet other embodiments, the second portion 116 of the primary tubing 110 may have a particular maximum inner diameter. For example, the maximum inner diameter of the second portion 116 of the primary tubing 110 may be at least about 3.0 mm, such as, at least about 3.5 mm or at least about 4.0 mm or at least about 4.5 mm or at least about 5.0 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the maximum inner diameter of the second portion 116 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the maximum inner diameter of the second portion 116 of the primary tubing 110 may be within a range between any of the values noted above. It will be further appreciated that the maximum inner diameter of the second portion 116 of the primary tubing 110 may be any value between any of the values noted above.

According to yet other embodiments, the second portion 116 of the primary tubing 110 may have a particular minimum inner diameter. For example, the minimum inner diameter of the second portion 116 of the primary tubing 110 may be at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the minimum inner diameter of the second portion 116 of the primary tubing 110 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the minimum inner diameter of the second portion 116 of the primary tubing 110 may be within a range between any of the values noted above. It will be further appreciated that the minimum inner diameter of the second portion 116 of the primary tubing 110 may be any value between any of the values noted above.

According to certain embodiments, the secondary tubing 120 may include a particular material. According to still other embodiments, the secondary tubing 120 may include a polymer material. According to yet other embodiments, the secondary tubing 120 may consist essentially of a polymer material. According to other embodiments, the polymer material of the secondary tubing 120 may include perfluoroalkoxy (PFA). According to yet other embodiments, the polymer material of the secondary tubing 120 may consist essentially of perfluoroalkoxy (PFA). According to still other embodiments, the secondary tubing 120 may include perfluoroalkoxy (PFA). According to yet other embodiments, the secondary tubing 120 may consist essentially of perfluoroalkoxy (PFA).

According to still other embodiments, the secondary tubing 120 may include an outer wall. According to yet other embodiments, the outer wall of the secondary tubing 120 may have a particular thickness. For example, the outer wall of the secondary tubing 120 may have a thickness of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the outer wall of the secondary tubing 120 may have a thickness of not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or even not greater than about 1.6 mm. It will be appreciated that the thickness of the outer wall of the secondary tubing 120 may be within a range between any of the values noted above. It will be further appreciated that the thickness of the outer wall of the secondary tubing 120 may be any value between any of the values noted above.

According to yet other embodiments, the secondary tubing 120 may have a particular average inner diameter. For example, the average inner diameter of the secondary tubing 120 may be at least about 5.0 mm or at least about 5.25 mm or at least about 5.5 mm or at least about 5.75 mm or at least about 6.0 mm or at least about 6.25 mm or at least about 6.5 mm or at least about 6.75 mm or at least about 7.0 mm or at least about 7.25 mm or at least about 7.5 mm or at least about 7.75 mm or at least about 8.0 mm or at least about 8.25 mm or at least about 8.5 mm or at least about 8.75 mm or at least about 9.0 mm or at least about 9.25 mm or at least about 9.5 mm or at least about 9.75 mm or at least about 10.0 mm or at least about 10.5 mm or at least about 11.0 mm or at least about 11.5 mm or at least about 12.0 mm or even at least about 12.5 mm. According to yet other embodiments, the average inner diameter of the secondary tubing 120 may be not greater than about 30 mm, such as, not greater than about 29.5 or not greater than about 29.0 mm or not greater than about 28.5 mm or not greater than about 28 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or not greater than about 14.0 mm. It will be appreciated that the average inner diameter of the outer wall of the secondary tubing 120 may be within a range between any of the values noted above. It will be further appreciated that the inner diameter of the outer wall of the secondary tubing 120 may be any value between any of the values noted above.

According to still other embodiments, the secondary tubing 120 may have a particular average outer diameter. For example, the average outer diameter of the secondary tubing 120 may be at least about 10 mm, such as, or at least about 10.5 mm or at least about 11.5 mm or at least about 12.0 mm or at least about 12.5 mm or at least about 13.0 mm or at least about 13.5 mm or at least about 14.0 mm or at least about 14.5 mm or at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or even at least about 22.5 mm. According to yet other embodiments, the average outer diameter of the secondary tubing 120 may be not greater than about 35 mm, such as, not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or even not greater than about 23.0 mm. It will be appreciated that the average outer diameter of the outer wall of the secondary tubing 120 may be within a range between any of the values noted above. It will be further appreciated that the outer diameter of the outer wall of the secondary tubing 120 may be any value between any of the values noted above.

According to certain embodiments, the flared end 122 of the secondary tubing 120 may include a particular material. According to still other embodiments, the flared end 122 of the secondary tubing 120 may include a polymer material. According to yet other embodiments, the flared end 122 of the secondary tubing 120 may consist essentially of a polymer material. According to other embodiments, the polymer material of the flared end 122 of the secondary tubing 120 may include perfluoroalkoxy (PFA). According to yet other embodiments, the polymer material of the flared end 122 of the secondary tubing 120 may consist essentially of perfluoroalkoxy (PFA). According to still other embodiments, the flared end 122 of the secondary tubing 120 may include perfluoroalkoxy (PFA). According to yet other embodiments, the flared end 122 of the secondary tubing 120 may consist essentially of perfluoroalkoxy (PFA).

According to still other embodiments, the flared end 122 of the secondary tubing 120 may include an outer wall. According to yet other embodiments, the outer wall of the flared end 122 of the secondary tubing 120 may have a particular thickness. For example, the outer wall of the flared end 122 of the secondary tubing 120 may have a thickness of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the outer wall of the flared end 122 of the secondary tubing 120 may have a thickness of not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or even not greater than about 1.6 mm. It will be appreciated that the thickness of the outer wall of the flared end 122 of the secondary tubing 120 may be within a range between any of the values noted above. It will be further appreciated that the thickness of the outer wall of the flared end 122 of the secondary tubing 120 may be any value between any of the values noted above.

According to yet other embodiments, the flared end 122 of the secondary tubing 120 may have a particular maximum inner diameter. For example, the maximum inner diameter of the flared end 122 of the secondary tubing 120 may be at least about 10 mm, such as, or at least about 10.5 mm or at least about 11.5 mm or at least about 12.0 mm or at least about 12.5 mm or at least about 13.0 mm or at least about 13.5 mm or at least about 14.0 mm or at least about 14.5 mm or at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or even at least about 22.5 mm. According to still other embodiments, the maximum inner diameter of the flared end 122 of the secondary tubing 120 may be not greater than about 40 mm, such as, not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm. It will be appreciated that the maximum inner diameter of the flared end 122 of the secondary tubing 120 may be within a range between any of the values noted above. It will be further appreciated that the maximum inner diameter of the flared end 122 of the secondary tubing 120 may be any value between any of the values noted above.

According to yet other embodiments, the flared end 122 of the secondary tubing 120 may have a particular minimum inner diameter. For example, the minimum inner diameter of the flared end 122 of the secondary tubing 120 may be at least about 10 mm, such as, at least about 10.5 mm or at least about 11.5 mm or at least about 12.0 mm or at least about 12.5 mm or at least about 13.0 mm or at least about 13.5 mm or at least about 14.0 mm or at least about 14.5 mm or at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or even at least about 22.5 mm. According to still other embodiments, the minimum inner diameter of the flared end 122 of the secondary tubing 120 may be not greater than about 40 mm, such as, not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or even not greater than about 23.0 mm. It will be appreciated that the minimum inner diameter of the flared end 122 of the secondary tubing 120 may be within a range between any of the values noted above. It will be further appreciated that the minimum inner diameter of the flared end 122 of the secondary tubing 120 may be any value between any of the values noted above.

According to yet other embodiments, the flared end 122 of the secondary tubing 120 may have a particular maximum outer diameter. For example, the maximum outer diameter of the flared end 122 of the secondary tubing 120 may be at least about 15.0 mm, such as, at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or even at least about 22.5 mm. According to still other embodiments, the maximum outer diameter of the flared end 122 of the secondary tubing 120 may be not greater than about 40 mm, such as, not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or even not greater than about 23.0 mm. It will be appreciated that the maximum outer diameter of the flared end 122 of the secondary tubing 120 may be within a range between any of the values noted above. It will be further appreciated that the maximum outer diameter of the flared end 122 of the secondary tubing 120 may be any value between any of the values noted above.

According to yet other embodiments, the flared end 122 of the secondary tubing 120 may have a particular minimum outer diameter. For example, the minimum outer diameter of the flared end 122 of the secondary tubing 120 may be at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the minimum outer diameter of the flared end 122 of the secondary tubing 120 may be not greater than about 25.0 mm, such as, not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the minimum outer diameter of the flared end 122 of the secondary tubing 120 may be within a range between any of the values noted above. It will be further appreciated that the minimum outer diameter of the flared end 122 of the secondary tubing 120 may be any value between any of the values noted above.

According to certain embodiments, the flared fitting portion 132 of the dual containment body 130 may include a particular material. According to still other embodiments, the flared fitting portion 132 of the dual containment body 130 may include a polymer material. According to yet other embodiments, the flared fitting portion 132 of the dual containment body 130 may consist essentially of a polymer material. According to other embodiments, the polymer material of the flared fitting portion 132 of the dual containment body 130 may include perfluoroalkoxy (PFA). According to yet other embodiments, the polymer material of the flared fitting portion 132 of the dual containment body 130 may consist essentially of perfluoroalkoxy (PFA). According to still other embodiments, the flared fitting portion 132 of the dual containment body 130 may include perfluoroalkoxy (PFA). According to yet other embodiments, the flared fitting portion 132 of the dual containment body 130 may consist essentially of perfluoroalkoxy (PFA).

According to yet other embodiments, the flared fitting portion 132 of the dual containment body 130 may have a particular average inner diameter. For example, the average inner diameter of the flared fitting portion 132 of the dual containment body 130 may be an average inner diameter of at least about 5.0 mm, such as, at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or even at least about 12.5 mm. According to still other embodiments, the average inner diameter of the flared fitting portion 132 of the dual containment body 130 may be not greater than about 30.0 mm or not greater than about 29.5 or not greater than about 29.0 mm or not greater than about 28.5 mm or not greater than about 28 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm. It will be appreciated that the average inner diameter of the flared fitting portion 132 of the dual containment body 130 may be within a range between any of the values noted above. It will be further appreciated that the average inner diameter of the flared fitting portion 132 of the dual containment body 130 may be any value between any of the values noted above.

According to certain embodiments, the primary containment nut potion 134 of the dual containment body 130 may include a particular material. According to still other embodiments, the primary containment nut potion 134 of the dual containment body 130 may include a polymer material. According to yet other embodiments, the primary containment nut potion 134 of the dual containment body 130 may consist essentially of a polymer material. According to other embodiments, the polymer material of the primary containment nut potion 134 of the dual containment body 130 may include perfluoroalkoxy (PFA). According to yet other embodiments, the polymer material of the primary containment nut potion 134 of the dual containment body 130 may consist essentially of perfluoroalkoxy (PFA). According to still other embodiments, the primary containment nut potion 134 of the dual containment body 130 may include perfluoroalkoxy (PFA). According to yet other embodiments, the primary containment nut potion 134 of the dual containment body 130 may consist essentially of perfluoroalkoxy (PFA).

According to still other embodiments, the primary containment nut potion 134 of the dual containment body 130 may include an outer wall. According to yet other embodiments, the outer wall of the primary containment nut potion 134 of the dual containment body 130 may have a particular thickness. For example, the outer wall of the primary containment nut potion 134 of the dual containment body 130 may have a thickness of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the outer wall of the primary containment nut potion 134 of the dual containment body 130 may have a thickness of not greater than about 5.0 mm, such as, not greater than about 4.75 mm or not greater than about 4.5 mm or not greater than about 4.25 mm or not greater than about 4.0 mm or not greater than about 3.75 mm or not greater than about 3.5 mm or not greater than about 3.25 mm or not greater than about 3.0 mm or not greater than about 2.75 mm or not greater than about 2.5 mm or not greater than about 2.25 mm or even not greater than about 2.0 mm. It will be appreciated that the thickness of the outer wall of the primary containment nut potion 134 of the dual containment body 130 may be within a range between any of the values noted above. It will be further appreciated that the thickness of the outer wall of the primary containment nut potion 134 of the dual containment body 130 may be any value between any of the values noted above.

According to yet other embodiments, the primary containment nut potion 134 of the dual containment body 130 may have a particular average inner diameter. For example, the average inner diameter of the primary containment nut potion 134 of the dual containment body 130 may be an average inner diameter of at least about 1 mm, such as, at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or even at least about 1.5 mm. According to still other embodiments, the average inner diameter of the primary containment nut potion 134 of the dual containment body 130 may be not greater than about 20 mm, such as, not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or even not greater than about 14.0 mm. It will be appreciated that the average inner diameter of the primary containment nut potion 134 of the dual containment body 130 may be within a range between any of the values noted above. It will be further appreciated that the average inner diameter of the primary containment nut potion 134 of the dual containment body 130 may be any value between any of the values noted above.

According to still other embodiments, the primary containment nut potion 134 of the dual containment body 130 may have a particular average outer diameter. For example, the average outer diameter of the primary containment nut potion 134 of the dual containment body 130 may be at least about 15.0 mm, such as, at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or even at least about 22.5 mm. According to yet other embodiments, the average outer diameter of the primary containment nut potion 134 of the dual containment body 130 may be not greater than about 40 mm, such as, not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or even not greater than about 23.0 mm. It will be appreciated that the average outer diameter of the outer wall of the primary containment nut potion 134 of the dual containment body 130 may be within a range between any of the values noted above. It will be further appreciated that the outer diameter of the outer wall of the primary containment nut potion 134 of the dual containment body 130 may be any value between any of the values noted above.

According to yet other embodiments, the outer wall of the primary containment nut portion 134 of the dual containment body 130 may include a particular number of leak passage holes 135. For example, the outer wall of the primary containment nut portion 134 of the dual containment body 130 may have at least one leak passage hole, such as, at least two leak passage holes or at least three leak passage holes or at least four leak passage holes or at least five leak passage holes or even at least six leak passage holes.

According to still other embodiments, each of the leak passage holes 135 may be equally spaced around the outer wall of the primary containment nut portion 134 of the dual containment body 130. According to still other embodiments, each of the leak passage holes 135 may pass through the outer wall of the primary containment nut portion 134 of the dual containment body 130.

According to yet other embodiments, each of the leak passage holes 135 may be configured for unidirectional fluid flow. According to still other embodiments, each of the leak passage holes 135 may be configured to allow flow from the third leak containment space 144 to the second leak containment space 142.

According to yet other embodiments, any of the leak passage holes 135 may have a particular inner diameter. For example, the inner diameter of the leak passage holes 135 may be at least about 0.5 mm, such as, at least about 0.6 mm or at least about 0.7 mm or at least about 0.8 mm or at least about 0.9 mm or at least about 1.0 mm or at least about 1.1 mm or even at least about 1.2 mm. According to yet other embodiments, the inner diameter of the leak passage holes 135 may be not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm. It will be appreciated that the inner diameter of any of the leak passage holes 135 may be within a range between any of the values noted above. It will be further appreciated that the inner diameter of any of the leak passage holes 135 may be any value between any of the values noted above.

According to certain embodiments, the secondary containment nut 150 may include a particular material. According to still other embodiments, the secondary containment nut 150 may include a polymer material. According to yet other embodiments, the secondary containment nut 150 may consist essentially of a polymer material. According to other embodiments, the polymer material of the secondary containment nut 150 may include perfluoroalkoxy (PFA). According to yet other embodiments, the polymer material of the secondary containment nut 150 may consist essentially of perfluoroalkoxy (PFA). According to still other embodiments, the secondary containment nut 150 may include perfluoroalkoxy (PFA). According to yet other embodiments, the secondary containment nut 150 may consist essentially of perfluoroalkoxy (PFA).

According to still other embodiments, the secondary containment nut 150 may include an outer wall. According to yet other embodiments, the outer wall of the secondary containment nut 150 may have a particular thickness. For example, the outer wall of the secondary containment nut 150 may have a thickness of at least about 3.0 mm, such as, at least about 3.25 mm or at least about 3.5 mm or at least about 3.75 mm or at least about 4.0 mm or at least about 4.25 mm or at least about 4.50 mm or at least about 4.75 mm or at least about 5.0 mm or at least about 5.25 mm or at least about 5.5 mm or at least about 5.75 mm or at least about 6.0 mm or at least about 6.25 mm or at least about 6.5 mm or at least about 6.75 mm or at least about 7.0 mm or at least about 7.25 mm or at least about 7.5 mm or at least about 7.75 mm or at least about 8.0 mm or at least about 8.25 mm or at least about 8.5 mm or at least about 8.75 mm or at least about 9.0 mm or at least about 9.25 mm or at least about 9.5 mm or at least about 9.75 mm or even at least about 10.0 mm. According to still other embodiments, the outer wall of the secondary containment nut 150 may have a thickness of not greater than about 20 mm, such as, not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or even not greater than about 14.0 mm. It will be appreciated that the thickness of the outer wall of the secondary containment nut 150 may be within a range between any of the values noted above. It will be further appreciated that the thickness of the outer wall of the secondary containment nut 150 may be any value between any of the values noted above.

According to yet other embodiments, the secondary containment nut 150 may have a particular inner diameter. For example, the inner diameter of the secondary containment nut 150 may be at least about 20.0 mm, such as, at least about 21.0 mm or at least about 22.0 mm or at least about 23.0 mm or at least about 24.0 mm or at least about 25.0 mm or at least about 26.0 mm or at least about 27.0 mm or at least about 28.0 mm or at least about 29.0 mm or even at least about 30.0 mm. According to yet other embodiments, the inner diameter of the secondary containment nut 150 may be not greater than about 50 mm, such as, not greater than about 49 mm or not greater than about 48 mm or not greater than about 47 mm or not greater than about 46 mm or not greater than about 45 mm or not greater than about 44 mm or not greater than about 43 mm or not greater than about 42 mm or not greater than about 41 mm or even not greater than about 40 mm. It will be appreciated that the inner diameter of the secondary containment nut 150 may be within a range between any of the values noted above. It will be further appreciated that the inner diameter of the secondary containment nut 150 may be any value between any of the values noted above.

According to yet other embodiments, the secondary containment nut 150 may have a particular outer diameter. For example, the outer diameter of the secondary containment nut 150 may be at least about 20.0 mm, such as, at least about 21.0 mm or at least about 22.0 mm or at least about 23.0 mm or at least about 24.0 mm or at least about 25.0 mm or at least about 26.0 mm or at least about 27.0 mm or at least about 28.0 mm or at least about 29.0 mm or even at least about 30.0 mm. According to yet other embodiments, the outer diameter of the secondary containment nut 150 may be not greater than about 60 mm, such as, not greater than about 59 mm or not greater than about 58 mm or not greater than about 57 mm or not greater than about 56 mm or not greater than about 55 mm or not greater than about 54 mm or not greater than about 53 mm or not greater than about 52 mm or not greater than about 51 mm or not greater than about 50 mm or not greater than about 49 mm or not greater than about 48 mm or not greater than about 47 mm or not greater than about 46 mm or not greater than about 45 mm or not greater than about 44 mm or not greater than about 43 mm or not greater than about 42 mm or not greater than about 41 mm or even not greater than about 40 mm. It will be appreciated that the outer diameter of the secondary containment nut 150 may be within a range between any of the values noted above. It will be further appreciated that the outer diameter of the secondary containment nut 150 may be any value between any of the values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A dual containment fitting comprising: a primary tubing having a flared end; a secondary tubing having a flared end, wherein the secondary tubing surrounds and is concentric with a first portion of the primary tubing forming a first leak containment space between the primary tubing and the secondary tubing; a dual containment body comprising a flare fitting portion, a primary containment nut portion and a bore therethrough, wherein the flare fitting portion surrounds and is concentric with a second portion of the primary tubing forming a second leak containment space between the primary tubing and the flare fitting portion, wherein the flare fitting portion compressively engages with the flared end of the secondary tubing connecting the first leak containment space with the second leak containment space, wherein the primary containment nut portion surrounds and is concentric with the flared end of the primary tubing forming a third leak containment space between the primary tubing and the primary containment nut portion, and wherein the primary containment nut portion comprises at least one leak passage hole connecting the third leak containment space with the second leak containment space.

Embodiment 2

A dual containment fitting assembly comprising: a primary tubing having a flared end; a secondary tubing having a flared end, wherein the secondary tubing surrounds and is concentric with a first portion of the primary tubing forming a first leak containment space between the primary tubing and the secondary tubing; a dual containment body comprising a flare fitting portion, a primary containment nut portion and a bore therethrough, wherein the flare fitting portion surrounds and is concentric with a second portion of the primary tubing forming a second leak containment space between the primary tubing and the flare fitting portion, wherein the flare fitting portion compressively engages with the flared end of the secondary tubing connecting the first leak containment space with the second leak containment space, wherein the primary containment nut portion surrounds and is concentric with the flared end of the primary tubing forming a third leak containment space between the primary tubing and the primary containment nut portion, and wherein the primary containment nut portion comprises at least one leak passage hole connecting the third leak containment space with the second leak containment space; and a valve assembly annular fitting body comprising a first end, a second end and a bore therethrough; wherein the first end of the annular fitting body is threadably engaged at the primary containment nut portion of the dual containment body so that the flared end of the primary tubing compressively engages within the first end if the annular fitting body.

Embodiment 3

The dual containment fitting or dual containment fitting assembly of any one of embodiments 1 and 2, wherein the primary tubing comprises a polymer material.

Embodiment 4

The dual containment fitting or dual containment fitting assembly of embodiment 3, wherein the comprises perfluoroalkoxy (PFA).

Embodiment 5

The dual containment fitting or dual containment fitting assembly of any one of embodiments 1 and 2, wherein the primary tubing comprises an outer wall having a thickness of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 6

The dual containment fitting or dual containment fitting assembly of any one of embodiments 1 and 2, wherein the primary tubing comprises an outer wall having a thickness of not greater than about 2.0 mm or not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm.

Embodiment 7

The dual containment fitting or dual containment fitting assembly of any one of embodiments 1 and 2, wherein the primary tubing comprises an average inner diameter of at least about 3.0 mm or at least about 3.25 mm or at least about 3.5 mm or at least about 3.75 mm or at least about 4.0 mm or at least about 4.25 mm or at least about 4.50 mm or at least about 4.75 mm or at least about 5.0 mm or at least about 5.25 mm or at least about 5.5 mm or at least about 5.75 mm or at least about 6.0 mm or at least about 6.25 mm or at least about 6.5 mm or at least about 6.75 mm or at least about 7.0 mm or at least about 7.25 mm or at least about 7.5 mm or at least about 7.75 mm or at least about 8.0 mm or at least about 8.25 mm or at least about 8.5 mm or at least about 8.75 mm or at least about 9.0 mm or at least about 9.25 mm or at least about 9.5 mm or at least about 9.75 mm or at least about 10.0 mm.

Embodiment 8

The dual containment fitting or dual containment fitting assembly of any one of embodiments 1 and 2, wherein the primary tubing comprises an average inner diameter of not greater than about 20 mm or not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or not greater than about 14.0 mm.

Embodiment 9

The dual containment fitting or dual containment fitting assembly of any one of embodiments 1 and 2, wherein the primary tubing comprises an average outer diameter of at least about 5 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11 mm or at least about 11.5 mm or at least about 12.0 mm or at least about 12.5 mm.

Embodiment 10

The dual containment fitting or dual containment fitting assembly of any one of embodiments 1 and 2, wherein the primary tubing comprises an average outer diameter of not greater than about 20 mm not greater than about 19.5 mm not greater than about 19.0 mm not greater than about 18 mm not greater than about 18.5 mm not greater than about 18 mm not greater than about 17.5 mm not greater than about 17.0 mm not greater than about 16.5 mm not greater than about 16.0 mm not greater than about 15.5 mm not greater than about 15.0 mm not greater than about 14.5 mm not greater than about 14.0 mm not greater than about 13.5 mm not greater than about 13 mm.

Embodiment 11

The dual containment fitting or dual containment fitting assembly of any one of embodiments 1 and 2, wherein the flared end of the primary tubing comprises a polymer material.

Embodiment 12

The dual containment fitting or dual containment fitting assembly of embodiment 11, wherein the polymer material comprises perfluoroalkoxy (PFA).

Embodiment 13

The dual containment fitting or dual containment fitting assembly of any one of embodiments 1 and 2, wherein the flared end of the primary tubing comprises an outer wall having a thickness of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 14

The dual containment fitting or dual containment fitting assembly of any one of embodiments 1 and 2, wherein the flared end of the primary tubing comprises an outer wall having a thickness of not greater than about 2.0 mm or not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm.

Embodiment 15

The dual containment fitting or dual containment fitting assembly of any one of embodiments 1 and 2, wherein the flared end of the primary tubing comprises a maximum inner diameter of at least about 5.0 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or at least about 12.5 mm.

Embodiment 16

The dual containment fitting or dual containment fitting assembly of any one of embodiments 1 and 2, wherein the flared end of the primary tubing comprises a maximum inner diameter of not greater than about 25.0 mm or not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm.

Embodiment 17

The dual containment fitting or dual containment fitting assembly of any one of embodiments 1 and 2, wherein the flared end of the primary tubing comprises a minimum inner diameter of at least about 5.0 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or at least about 12.5 mm.

Embodiment 18

The dual containment fitting or dual containment fitting assembly of any one of embodiments 1 and 2, wherein the flared end of the primary tubing comprises a minimum inner diameter of not greater than about 25.0 mm or not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm.

Embodiment 19

The dual containment fitting or dual containment fitting assembly of any one of embodiments 1 and 2, wherein the flared end of the primary tubing comprises a maximum outer diameter of at least about 5.0 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or at least about 12.5 mm.

Embodiment 20

The dual containment fitting or dual containment fitting assembly of any one of embodiments 1 and 2, wherein the flared end of the primary tubing comprises a maximum outer diameter of not greater than about 25.0 mm or not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm.

Embodiment 21

The dual containment fitting or dual containment fitting assembly of any one of embodiments 1 and 2, wherein the first portion of the primary tubing comprises a polymer material.

Embodiment 22

The dual containment fitting or dual containment fitting assembly of embodiment 21, wherein the polymer material comprises perfluoroalkoxy (PFA).

Embodiment 23

The dual containment fitting or dual containment fitting assembly of any one of embodiments 1 and 2, wherein the first portion of the primary tubing comprises an outer wall having a thickness of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 24

The dual containment fitting or dual containment fitting assembly of any one of embodiments 1 and 2, wherein the first portion of the primary tubing comprises an outer wall having a thickness of not greater than about 2.0 mm or not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm.

Embodiment 25

The dual containment fitting or dual containment fitting assembly of any one of embodiments 1 and 2, wherein the first portion of primary tubing comprises an inner diameter of at least about 3.0 mm or at least about 3.25 mm or at least about 3.5 mm or at least about 3.75 mm or at least about 4.0 mm or at least about 4.25 mm or at least about 4.50 mm or at least about 4.75 mm or at least about 5.0 mm or at least about 5.25 mm or at least about 5.5 mm or at least about 5.75 mm or at least about 6.0 mm or at least about 6.25 mm or at least about 6.5 mm or at least about 6.75 mm or at least about 7.0 mm or at least about 7.25 mm or at least about 7.5 mm or at least about 7.75 mm or at least about 8.0 mm or at least about 8.25 mm or at least about 8.5 mm or at least about 8.75 mm or at least about 9.0 mm or at least about 9.25 mm or at least about 9.5 mm or at least about 9.75 mm or at least about 10.0 mm.

Embodiment 26

The dual containment fitting or dual containment fitting assembly of any one of embodiments 1 and 2, wherein the first portion of the primary tubing comprises an inner diameter of not greater than about 20 mm or not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or not greater than about 14.0 mm.

Embodiment 27

The dual containment fitting or dual containment fitting assembly of any one of embodiments 1 and 2, wherein the first portion of the primary tubing comprises an outer diameter of at least about 5 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11 mm or at least about 11.5 mm or at least about 12.0 mm or at least about 12.5 mm.

Embodiment 28

The dual containment fitting or dual containment fitting assembly of any one of embodiments 1 and 2, wherein the first portion of the primary tubing comprises an outer diameter of not greater than about 20 mm not greater than about 19.5 mm not greater than about 19.0 mm not greater than about 18 mm not greater than about 18.5 mm not greater than about 18 mm not greater than about 17.5 mm not greater than about 17.0 mm not greater than about 16.5 mm not greater than about 16.0 mm not greater than about 15.5 mm not greater than about 15.0 mm not greater than about 14.5 mm not greater than about 14.0 mm not greater than about 13.5 mm not greater than about 13 mm.

Embodiment 29

The dual containment fitting or dual containment fitting assembly of any one of embodiments 1 and 2, wherein the second portion of the primary tubing comprises a polymer material.

Embodiment 30

The dual containment fitting or dual containment fitting assembly of embodiment 29, wherein the polymer material comprises perfluoroalkoxy (PFA).

Embodiment 31

The dual containment fitting or dual containment fitting assembly of any one of embodiments 1 and 2, wherein the second portion of the primary tubing comprises an outer wall having a thickness of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 32

The dual containment fitting or dual containment fitting assembly of any one of embodiments 1 and 2, wherein the second portion of the primary tubing comprises an outer wall having a thickness of not greater than about 2.0 mm or not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm.

Embodiment 33

The dual containment fitting or dual containment fitting assembly of any one of embodiments 1 and 2, wherein the second portion of primary tubing comprises an inner diameter of at least about 3.0 mm or at least about 3.25 mm or at least about 3.5 mm or at least about 3.75 mm or at least about 4.0 mm or at least about 4.25 mm or at least about 4.50 mm or at least about 4.75 mm or at least about 5.0 mm or at least about 5.25 mm or at least about 5.5 mm or at least about 5.75 mm or at least about 6.0 mm or at least about 6.25 mm or at least about 6.5 mm or at least about 6.75 mm or at least about 7.0 mm or at least about 7.25 mm or at least about 7.5 mm or at least about 7.75 mm or at least about 8.0 mm or at least about 8.25 mm or at least about 8.5 mm or at least about 8.75 mm or at least about 9.0 mm or at least about 9.25 mm or at least about 9.5 mm or at least about 9.75 mm or at least about 10.0 mm.

Embodiment 34

The dual containment fitting or dual containment fitting assembly of any one of embodiments 1 and 2, wherein the second portion of the primary tubing comprises an inner diameter of not greater than about 20 mm or not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or not greater than about 14.0 mm.

Embodiment 35

The dual containment fitting or dual containment fitting assembly of any one of embodiments 1 and 2, wherein the second portion of the primary tubing comprises an outer diameter of at least about 5 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11 mm or at least about 11.5 mm or at least about 12.0 mm or at least about 12.5 mm.

Embodiment 36

The dual containment fitting or dual containment fitting assembly of any one of embodiments 1 and 2, wherein the second portion of the primary tubing comprises an outer diameter of not greater than about 20 mm not greater than about 19.5 mm not greater than about 19.0 mm not greater than about 18 mm not greater than about 18.5 mm not greater than about 18 mm not greater than about 17.5 mm not greater than about 17.0 mm not greater than about 16.5 mm not greater than about 16.0 mm not greater than about 15.5 mm not greater than about 15.0 mm not greater than about 14.5 mm not greater than about 14.0 mm not greater than about 13.5 mm not greater than about 13 mm.

Embodiment 37

The dual containment fitting or dual containment fitting assembly of any one of embodiments 1 and 2, wherein the secondary tubing comprises a polymer material.

Embodiment 38

The dual containment fitting or dual containment fitting assembly of embodiment 37, wherein the polymer material comprises perfluoroalkoxy (PFA).

Embodiment 39

The dual containment fitting or dual containment fitting assembly of any one of embodiments 1 and 2, wherein the secondary tubing comprises an outer wall having a thickness of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 40

The dual containment fitting or dual containment fitting assembly of any one of embodiments 1 and 2, wherein the primary tubing comprises an outer wall having a thickness of not greater than about 2.0 mm or not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm.

Embodiment 41

The dual containment fitting or dual containment fitting assembly of any one of embodiments 1 and 2, wherein the secondary tubing comprises an average inner diameter of at least about 5.0 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or at least about 12.5 mm.

Embodiment 42

The dual containment fitting or dual containment fitting assembly of any one of embodiments 1 and 2, wherein the secondary tubing comprises an average inner diameter of not greater than about 30.0 mm or not greater than about 29.5 or not greater than about 29.0 mm or not greater than about 28.5 mm or not greater than about 28 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm.

Embodiment 43

The dual containment fitting or dual containment fitting assembly of any one of embodiments 1 and 2, wherein the secondary tubing comprises an average outer diameter of at least about 10 mm or at least about 10.5 mm or at least about 11.5 mm or at least about 12.0 mm or at least about 12.5 mm or at least about 13.0 mm or at least about 13.5 mm or at least about 14.0 mm or at least about 14.5 mm or at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or at least about 22.5 mm.

Embodiment 44

The dual containment fitting or dual containment fitting assembly of any one of embodiments 1 and 2, wherein the secondary tubing comprises an average outer diameter of not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm.

Embodiment 45

The dual containment fitting or dual containment fitting assembly of any one of embodiments 1 and 2, wherein the flared end of the secondary tubing comprises a polymer material.

Embodiment 46

The dual containment fitting or dual containment fitting assembly of embodiment 45, wherein the polymer material comprises perfluoroalkoxy (PFA).

Embodiment 47

The dual containment fitting or dual containment fitting assembly of any one of embodiments 1 and 2, wherein the flared end of the secondary tubing comprises an outer wall having a thickness of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 48

The dual containment fitting or dual containment fitting assembly of any one of embodiments 1 and 2, wherein the flared end of the secondary tubing comprises an outer wall having a thickness of not greater than about 2.0 mm or not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm.

Embodiment 49

The dual containment fitting or dual containment fitting assembly of any one of embodiments 1 and 2, wherein the flared end of the secondary tubing comprises a maximum inner diameter of at least about 10 mm or at least about 10.5 mm or at least about 11.5 mm or at least about 12.0 mm or at least about 12.5 mm or at least about 13.0 mm or at least about 13.5 mm or at least about 14.0 mm or at least about 14.5 mm or at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or at least about 22.5 mm.

Embodiment 50

The dual containment fitting or dual containment fitting assembly of any one of embodiments 1 and 2, wherein the flared end of the secondary tubing comprises a maximum inner diameter of not greater than about 40 mm or not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm.

Embodiment 51

The dual containment fitting or dual containment fitting assembly of any one of embodiments 1 and 2, wherein the flared end of the secondary tubing comprises a minimum inner diameter of at least about 10 mm or at least about 10.5 mm or at least about 11.5 mm or at least about 12.0 mm or at least about 12.5 mm or at least about 13.0 mm or at least about 13.5 mm or at least about 14.0 mm or at least about 14.5 mm or at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or at least about 22.5 mm.

Embodiment 52

The dual containment fitting or dual containment fitting assembly of any one of embodiments 1 and 2, wherein the flared end of the secondary tubing comprises a minimum inner diameter of not greater than about 40 mm or not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm.

Embodiment 53

The dual containment fitting or dual containment fitting assembly of any one of embodiments 1 and 2, wherein the flared end of the secondary tubing comprises a maximum outer diameter of at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or at least about 22.5 mm.

Embodiment 54

The dual containment fitting or dual containment fitting assembly of any one of embodiments 1 and 2, wherein the flared end of the secondary tubing comprises a maximum outer diameter of not greater than about 40 mm or not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm.

Embodiment 55

The dual containment fitting or dual containment fitting assembly of any one of embodiments 1 and 2, wherein flared fitting portion of the dual containment body comprises a polymer material.

Embodiment 56

The dual containment fitting or dual containment fitting assembly of embodiment 55, wherein the polymer material comprises perfluoroalkoxy (PFA).

Embodiment 57

The dual containment fitting or dual containment fitting assembly of any one of embodiments 1 and 2, wherein the flared fitting portion of the dual containment body comprises an average inner diameter of at least about 5.0 mm or at least about 5.5 mm or at least about 6.0 mm or at least about 6.5 mm or at least about 7.0 mm or at least about 7.5 mm or at least about 8.0 mm or at least about 8.5 mm or at least about 9.0 mm or at least about 9.5 mm or at least about 10.0 mm or at least about 10.5 mm or at least about 11.0 mm or at least about 11.5 mm or at least about 12.0 mm or at least about 12.5 mm.

Embodiment 58

The dual containment fitting or dual containment fitting assembly of any one of embodiments 1 and 2, wherein the flared fitting portion of the dual containment body comprises an average inner diameter of not greater than about 30.0 mm or not greater than about 29.5 or not greater than about 29.0 mm or not greater than about 28.5 mm or not greater than about 28 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm or not greater than about 22.5 mm or not greater than about 22.0 mm or not greater than about 21.5 mm or not greater than about 21.0 mm or not greater than about 20.5 mm or not greater than about 20.0 mm or not greater than about 19.5 mm or not greater than about 19.0 mm or not greater than about 18.5 mm or not greater than about 18.0 mm or not greater than about 17.5 mm or not greater than about 17.0 mm or not greater than about 16.5 mm or not greater than about 16.0 mm or not greater than about 15.5 mm or not greater than about 15.0 mm or not greater than about 14.5 mm or not greater than about 14.0 mm or not greater than about 13.5 mm or not greater than about 13.0 mm.

Embodiment 59

The dual containment fitting or dual containment fitting assembly of any one of embodiments 1 and 2, wherein the primary containment nut portion comprises a polymer material.

Embodiment 60

The dual containment fitting or dual containment fitting assembly of embodiment 59, wherein the polymer material comprises perfluoroalkoxy (PFA).

Embodiment 61

The dual containment fitting or dual containment fitting assembly of any one of embodiments 1 and 2, wherein the primary containment nut portion comprises an outer wall having a thickness of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 62

The dual containment fitting or dual containment fitting assembly of any one of embodiments 1 and 2, wherein the primary containment nut portion comprises an outer wall having a thickness of not greater than about 5.0 mm or not greater than about 4.75 mm or not greater than about 4.5 mm or not greater than about 4.25 mm or not greater than about 4.0 mm or not greater than about 3.75 mm or not greater than about 3.5 mm or not greater than about 3.25 mm or not greater than about 3.0 mm or not greater than about 2.75 mm or not greater than about 2.5 mm or not greater than about 2.25 mm or not greater than about 2.0 mm.

Embodiment 63

The dual containment fitting or dual containment fitting assembly of any one of embodiments 1 and 2, wherein the primary containment nut portion comprises an average inner diameter of at least about 1 mm or at least about 1.05 mm or at least about 1.1 mm or at least about 1.15 mm or at least about 1.2 mm or at least about 1.25 mm or at least about 1.3 mm or at least about 1.35 mm or at least about 1.4 mm or at least about 1.45 mm or at least about 1.5 mm.

Embodiment 64

The dual containment fitting or dual containment fitting assembly of any one of embodiments 1 and 2, wherein the primary containment nut portion comprises an average inner diameter of not greater than about 20 mm or not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or not greater than about 14.0 mm.

Embodiment 65

The dual containment fitting or dual containment fitting assembly of any one of embodiments 1 and 2, wherein the primary containment nut portion comprises an average outer diameter of at least about 15.0 mm or at least about 15.5 mm or at least about 16.0 mm or at least about 16.5 mm or at least about 17.0 mm or at least about 17.5 mm or at least about 18.0 mm or at least about 18.5 mm or at least about 19.0 mm or at least about 19.5 mm or at least about 20 mm or at least about 20.5 mm or at least about 21.0 mm or at least about 21.5 mm or at least about 22.0 mm or at least about 22.5 mm.

Embodiment 66

The dual containment fitting or dual containment fitting assembly of any one of embodiments 1 and 2, wherein the primary containment nut portion comprises an average outer diameter of not greater than about 40 mm or not greater than about 39.5 mm or not greater than about 39.0 mm or not greater than about 38.5 mm or not greater than about 38.0 mm or not greater than about 37 mm or not greater than about 36.5 mm or not greater than about 36 mm or not greater than about 35.5 mm not greater than about 35 mm or not greater than about 34.5 mm or not greater than about 34.0 mm or not greater than about 33.5 mm or not greater than about 33.0 mm or not greater than about 32.5 mm or not greater than about 32.0 mm or not greater than about 31.5 mm or not greater than about 31.0 mm or not greater than about 30.5 mm or not greater than about 30.0 mm or not greater than about 29.5 mm or not greater than about 29.0 mm or not greater than about 28.5 mm or not greater than about 28.0 mm or not greater than about 27.5 mm or not greater than about 27.0 mm or not greater than about 26.5 mm or not greater than about 26.0 mm or not greater than about 25.5 mm or not greater than about 25.0 mm or not greater than about 24.5 mm or not greater than about 24.0 mm or not greater than about 23.5 mm or not greater than about 23.0 mm.

Embodiment 67

The dual containment fitting or dual containment fitting assembly of any one of embodiments 1 and 2, wherein the primary containment nut portion comprises an outer wall and wherein the at least one leak passage hole is disposed in the outer wall of the primary containment nut portion.

Embodiment 68

The dual containment fitting or dual containment fitting assembly of embodiment 67, wherein the primary containment nut portion comprises at least two leak passage holes disposed in the outer wall of the primary containment nut, at least three leak passage holes, at least four leak passage holes, at least five leak passage holes, at least six leak passage holes.

Embodiment 69

The dual containment fitting or dual containment fitting assembly of embodiment 68, wherein each of the leak passage holes are equally spaced around the outer wall of the primary containment nut portion.

Embodiment 70

The dual containment fitting or dual containment fitting assembly of embodiment 68, wherein each of the leak passage holes are configured for unidirectional fluid flow.

Embodiment 71

The dual containment fitting or dual containment fitting assembly of embodiment 70, wherein each of the leak passage holes are configured to allow flow from the third leak containment space to the second leak containment space.

Embodiment 72

The dual containment fitting or dual containment fitting assembly of any one of embodiments 1 and 2, wherein the primary containment nut portion comprises an outer wall and wherein the at least one leak passage hole passed through the outer wall of the primary containment nut portion.

Embodiment 73

The dual containment fitting or dual containment fitting assembly of any one of embodiments 1, 2, 67, and 72, wherein the at least one leak passage hole comprises an inner diameter of at least about 0.5 mm or at least about 0.6 mm or at least about 0.7 mm or at least about 0.8 mm or at least about 0.9 mm or at least about 1.0 mm or at least about 1.1 mm or at least about 1.2 mm.

Embodiment 74

The dual containment fitting or dual containment fitting assembly of any one of embodiments 1, 2, 67, and 72, wherein the at least one leak passage hole comprises an inner diameter of not greater than about 2.0 mm or not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm.

Embodiment 75

The dual containment fitting or dual containment fitting assembly of any one of embodiments 1 and 2, wherein the dual containment fitting or dual containment fitting assembly further comprises a secondary containment nut.

Embodiment 76

The dual containment fitting or dual containment fitting assembly of embodiment 75, wherein the secondary containment nut surrounds and is concentric with the flared end of the secondary tubing.

Embodiment 77

The dual containment fitting or dual containment fitting assembly of embodiment 76, wherein the secondary containment nut threadably engages with the flare fitting portion of the dual containment body.

Embodiment 78

The dual containment fitting or dual containment fitting assembly of embodiment 76, wherein the secondary containment nut is configured to compressively engage the flared end of the secondary tubing with the flare fitting portion of the dual containment body.

Embodiment 79

The dual containment fitting or dual containment fitting assembly of embodiment 76, wherein the secondary containment nut comprises a polymer material.

Embodiment 80

The dual containment fitting or dual containment fitting assembly of embodiment 79, wherein the polymer material comprises perfluoroalkoxy (PFA), ethylene tetrafluoroethylene (ETFE) or polyvinylidene fluoride (PVDF).

Embodiment 81

The dual containment fitting or dual containment fitting assembly of embodiment 76, wherein secondary containment nut comprises an outer wall having a thickness of at least about 3.0 mm or at least about 3.25 mm or at least about 3.5 mm or at least about 3.75 mm or at least about 4.0 mm or at least about 4.25 mm or at least about 4.50 mm or at least about 4.75 mm or at least about 5.0 mm or at least about 5.25 mm or at least about 5.5 mm or at least about 5.75 mm or at least about 6.0 mm or at least about 6.25 mm or at least about 6.5 mm or at least about 6.75 mm or at least about 7.0 mm or at least about 7.25 mm or at least about 7.5 mm or at least about 7.75 mm or at least about 8.0 mm or at least about 8.25 mm or at least about 8.5 mm or at least about 8.75 mm or at least about 9.0 mm or at least about 9.25 mm or at least about 9.5 mm or at least about 9.75 mm or at least about 10.0 mm.

Embodiment 82

The dual containment fitting or dual containment fitting assembly of embodiment 76, wherein the secondary containment nut comprises an outer wall having a thickness of not greater than about 20 mm or not greater than about 19.75 mm or not greater than about 19.5 mm or not greater than about 19.25 mm or not greater than about 19.0 mm or not greater than about 18.75 mm or not greater than about 18.5 mm or not greater than about 18.25 mm or not greater than about 18.0 mm or not greater than about 17.75 mm or not greater than about 17.5 mm or not greater than about 17.25 mm or not greater than about 17.0 mm or not greater than about 16.75 mm or not greater than about 16.5 mm or not greater than about 16.0 mm or not greater than about 15.75 mm or not greater than about 15.5 mm or not greater than about 15.25 mm or not greater than about 15.0 mm or not greater than about 14.75 mm or not greater than about 14.5 mm or not greater than about 14.25 mm or not greater than about 14.0 mm.

Embodiment 83

The dual containment fitting or dual containment fitting assembly of embodiment 76, wherein the secondary containment nut comprises an average inner diameter of at least about 20.0 mm or at least about 21.0 mm or at least about 22.0 mm or at least about 23.0 mm or at least about 24.0 mm or at least about 25.0 mm or at least about 26.0 mm or at least about 27.0 mm or at least about 28.0 mm or at least about 29.0 mm or at least about 30.0 mm.

Embodiment 84

The dual containment fitting or dual containment fitting assembly of embodiment 76, wherein the secondary containment nut portion comprises an average inner diameter of not greater than about 50 mm or not greater than about 49 mm or not greater than about 48 mm or not greater than about 47 mm or not greater than about 46 mm or not greater than about 45 mm or not greater than about 44 mm or not greater than about 43 mm or not greater than about 42 mm or not greater than about 41 mm or not greater than about 40 mm.

Embodiment 85

The dual containment fitting or dual containment fitting assembly of embodiment 76, wherein the secondary containment nut portion comprises an average outer diameter of at least about 20.0 mm or at least about 21.0 mm or at least about 22.0 mm or at least about 23.0 mm or at least about 24.0 mm or at least about 25.0 mm or at least about 26.0 mm or at least about 27.0 mm or at least about 28.0 mm or at least about 29.0 mm or at least about 30.0 mm.

Embodiment 86

The dual containment fitting or dual containment fitting assembly of embodiment 76, wherein the secondary containment nut portion comprises an average outer diameter of not greater than about 60 mm or not greater than about 59 mm or not greater than about 58 mm or not greater than about 57 mm or not greater than about 56 mm or not greater than about 55 mm or not greater than about 54 mm or not greater than about 53 mm or not greater than about 52 mm or not greater than about 51 mm or not greater than about 50 mm or not greater than about 49 mm or not greater than about 48 mm or not greater than about 47 mm or not greater than about 46 mm or not greater than about 45 mm or not greater than about 44 mm or not greater than about 43 mm or not greater than about 42 mm or not greater than about 41 mm or not greater than about 40 mm.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A dual containment fitting comprising:
   a primary tubing having a flared end;
   a secondary tubing having a flared end, wherein the secondary tubing surrounds and is concentric with a first portion of the primary tubing forming a first leak containment space between the primary tubing and the secondary tubing;
   a dual containment body comprising a flare fitting portion, a primary containment nut portion and a bore therethrough,
      wherein the flare fitting portion surrounds and is concentric with a second portion of the primary tubing forming a second leak containment space between the primary tubing and a bottom surface of the flare fitting portion,
      wherein the flare fitting portion compressively engages with the flared end of the secondary tubing connecting the first leak containment space with the second leak containment space so that the flare fitting portion contacts with the secondary tubing only on an inside of the flared end of the secondary tubing,
      wherein the primary containment nut portion surrounds and is concentric with the flared end of the primary tubing forming a third leak containment space between the primary tubing and the primary containment nut portion,
      wherein the primary containment nut portion comprises at least one leak passage hole connecting the third leak containment space with the second leak containment space, wherein the dual containment fitting assembly further comprises a secondary containment nut, wherein the secondary containment nut surrounds and is concentric with the flared end of the secondary tubing, wherein the secondary containment nut threadably engages with the flare fitting portion of the dual containment body.

2. The dual containment fitting of claim 1, wherein the primary tubing, the secondary tubing or the dual containment body comprises a polymer material.

3. The dual containment fitting of claim 2, wherein the primary tubing, the secondary tubing or the dual containment body comprises perfluoroalkoxy (PFA).

4. The dual containment fitting of claim 1, wherein the primary containment nut portion comprises a polymer material.

5. The dual containment fitting of claim 4, wherein the polymer material comprises perfluoroalkoxy (PFA).

6. The dual containment fitting of claim 1, wherein the primary containment nut portion comprises an outer wall having a thickness of at least about 1 mm and not greater than about 5.0 mm.

7. The dual containment fitting of claim 1, wherein the primary containment nut portion comprises an outer wall and wherein the at least one leak passage hole is disposed in the outer wall of the primary containment nut portion.

8. The dual containment fitting of claim 7, wherein the primary containment nut portion comprises at least two leak passage holes disposed in the outer wall of the primary containment nut portion.

9. The dual containment fitting of claim 8, wherein each of the leak passage holes are equally spaced around the outer wall of the primary containment nut portion.

10. The dual containment fitting of claim 8, wherein each of the leak passage holes are configured for unidirectional fluid flow.

11. The dual containment fitting of claim 10, wherein each of the leak passage holes are configured to allow flow from the third leak containment space to the second leak containment space.

12. The dual containment fitting of claim 1, wherein the primary containment nut portion comprises an outer wall and wherein the at least one leak passage hole passed through the outer wall of the primary containment nut portion.

13. The dual containment fitting of claim 1, wherein the at least one leak passage hole comprises an inner diameter of at least about 0.5 mm and not greater than about 2.0 mm.

14. The dual containment fitting of claim 1, wherein the primary tubing comprises an average inner diameter of at least about 3 mm and not greater than about 20 mm.

15. The dual containment fitting of claim 1, wherein the primary tubing comprises an average outer diameter of at least about 5 mm and not greater than about 20 mm.

16. A dual containment fitting assembly comprising:
a primary tubing having a flared end;
a secondary tubing having a flared end, wherein the secondary tubing surrounds and is concentric with a first portion of the primary tubing forming a first leak containment space between the primary tubing and the secondary tubing;
a dual containment body comprising a flare fitting portion, a primary containment nut portion and a bore therethrough,
wherein the flare fitting portion surrounds and is concentric with a second portion of the primary tubing forming a second leak containment space between the primary tubing and a bottom surface of the flare fitting portion,
wherein the flare fitting portion compressively engages with the flared end of the secondary tubing connecting the first leak containment space with the second leak containment space so that the flare fitting portion contacts with the secondary tubing only on an inside of the flared end of the secondary tubing,
wherein the primary containment nut portion surrounds and is concentric with the flared end of the primary tubing forming a third leak containment space between the primary tubing and the primary containment nut portion, and
wherein the primary containment nut portion comprises at least one leak passage hole connecting the third leak containment space with the second leak containment space; and
a valve assembly annular fitting body comprising a first end, a second end and a bore therethrough;
wherein the first end of the annular fitting body is threadably engaged at the primary containment nut portion of the dual containment body so that the flared end of the primary tubing compressively engages within the first end of the annular fitting body, wherein the dual containment fitting assembly further comprises a secondary containment nut, wherein the secondary containment nut surrounds and is concentric with the flared end of the secondary tubing, wherein the secondary containment nut threadably engages with the flare fitting portion of the dual containment body.

17. The dual containment fitting assembly of claim 16, wherein the primary containment nut portion comprises an outer wall and wherein the at least one leak passage hole passed through the outer wall of the primary containment nut portion.

* * * * *